United States Patent
Kang et al.

(10) Patent No.: US 8,031,667 B2
(45) Date of Patent: Oct. 4, 2011

(54) METHOD FOR MANAGING MULTIPLE FREQUENCY ASSIGNMENT USING TERMINAL'S RECEIVED PERFORMANCE IN OFDMA WRAN SYSTEM

(75) Inventors: Bub-Joo Kang, Daejon (KR); Chang-Joo Kim, Daejon (KR); Myung-Sun Song, Daejon (KR); Gwang-Zeen Ko, Seoul (KR); Sung-Hyun Hwang, Gyeonggi-do (KR); Hyung-Rae Park, Gyeonggi-do (KR)

(73) Assignee: Electronics and Telecommunications Research Institute, Daejon (KR)

( * ) Notice: Subject to any disclaimer, the term of this patent is extended or adjusted under 35 U.S.C. 154(b) by 164 days.

(21) Appl. No.: 12/376,657

(22) PCT Filed: Aug. 8, 2007

(86) PCT No.: PCT/KR2007/003817
§ 371 (c)(1),
(2), (4) Date: Feb. 6, 2009

(87) PCT Pub. No.: WO2008/018755
PCT Pub. Date: Feb. 14, 2008

(65) Prior Publication Data
US 2010/0177645 A1    Jul. 15, 2010

(30) Foreign Application Priority Data
Aug. 8, 2006  (KR) .................. 10-2006-0074927

(51) Int. Cl.
H04W 4/00 (2009.01)
(52) U.S. Cl. ........................................ 370/329; 370/332
(58) Field of Classification Search ........... 370/329–349
See application file for complete search history.

(56) References Cited

U.S. PATENT DOCUMENTS

| | | | |
|---|---|---|---|
| 2002/0036992 A1 | 3/2002 | Balachandran et al. | |
| 2003/0100267 A1* | 5/2003 | Itoh et al. ..................... | 455/69 |
| 2003/0153358 A1* | 8/2003 | Moon et al. .................. | 455/561 |
| 2004/0110510 A1* | 6/2004 | Jeon et al. .................... | 455/450 |
| 2005/0068884 A1* | 3/2005 | Yoon et al. ................... | 370/203 |

(Continued)

FOREIGN PATENT DOCUMENTS

JP    2004-180154 A    6/2004

(Continued)

OTHER PUBLICATIONS

Severine Catreux et al; "Adaptive Modulation and MIMO Coding for Broadband Wireless Data Networks" IEEE Communications Magazine, Jun. 2002, pp. 108-115.
International Search Report; mailed Nov. 13, 2007; PCT/KR2007/003817.

*Primary Examiner* — Kwang B Yao
*Assistant Examiner* — Juvena Loo
(74) *Attorney, Agent, or Firm* — Ladas & Parry LLP

(57) ABSTRACT

There is a provided a method for managing a multiple frequency assignment using a terminals RX performance in an orthogonal frequency division multiple access (OFDMA) wireless regional area network (WRAN) system, including: a) measuring a bit energy/noise power spectral density (Eb/No) and a received signal strength indicator (RSSI) which are received in the terminal; b) informing the measured Eb/No and RSSI of a base station; c) calculating a round trip delay (RTD) in the base station; d) determining a terminal performance level based on the measured Eb/No, RSSI and the calculated RTD; and e) determining a frequency channel and modulation scheme based on the determined performance level.

4 Claims, 3 Drawing Sheets

U.S. PATENT DOCUMENTS

| | | | |
|---|---|---|---|
| 2005/0245258 A1* | 11/2005 | Classon et al. | 455/434 |
| 2005/0265489 A1* | 12/2005 | Chang et al. | 375/340 |
| 2006/0008037 A1* | 1/2006 | Chang et al. | 375/346 |
| 2006/0165091 A1 | 7/2006 | Arima et al. | |
| 2006/0268976 A1* | 11/2006 | Baum et al. | 375/239 |
| 2007/0230324 A1* | 10/2007 | Li et al. | 370/204 |
| 2008/0188184 A1* | 8/2008 | Nogami et al. | 455/67.11 |

FOREIGN PATENT DOCUMENTS

| | | |
|---|---|---|
| JP | 2005-136773 A | 5/2005 |
| KR | 1020020050667 A | 6/2002 |
| KR | 1020020056808 A | 7/2002 |
| KR | 1020050050322 A | 5/2005 |
| KR | 1020050089699 A | 9/2005 |

* cited by examiner

[Fig. 1]
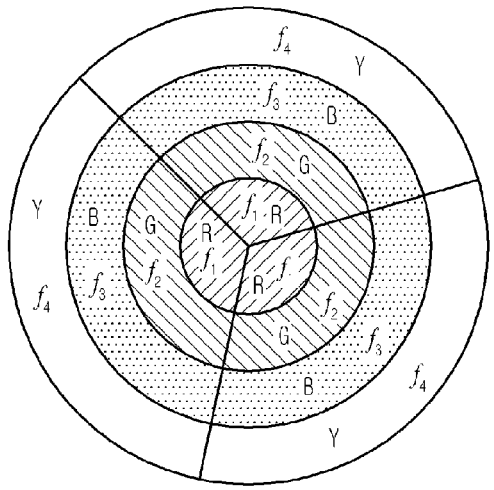
[Fig. 2]
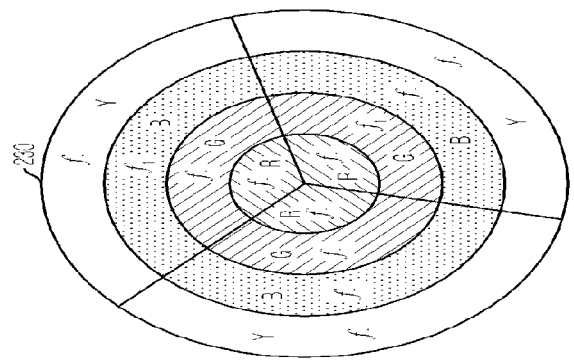
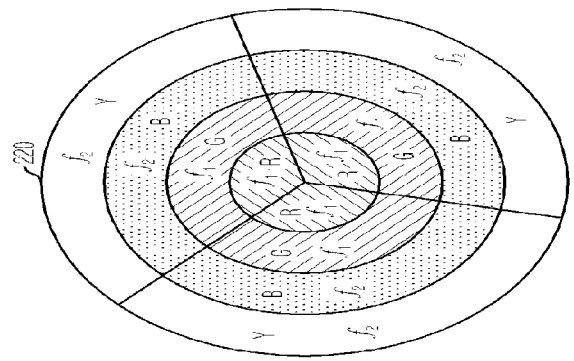
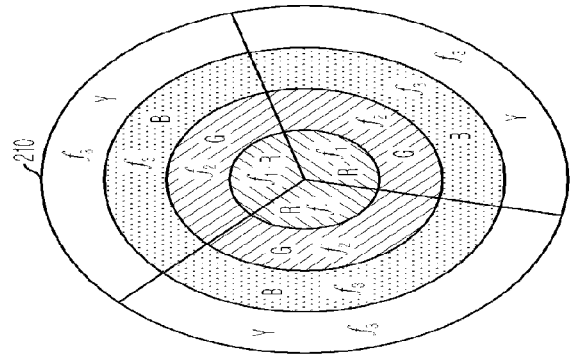

[Fig. 3]
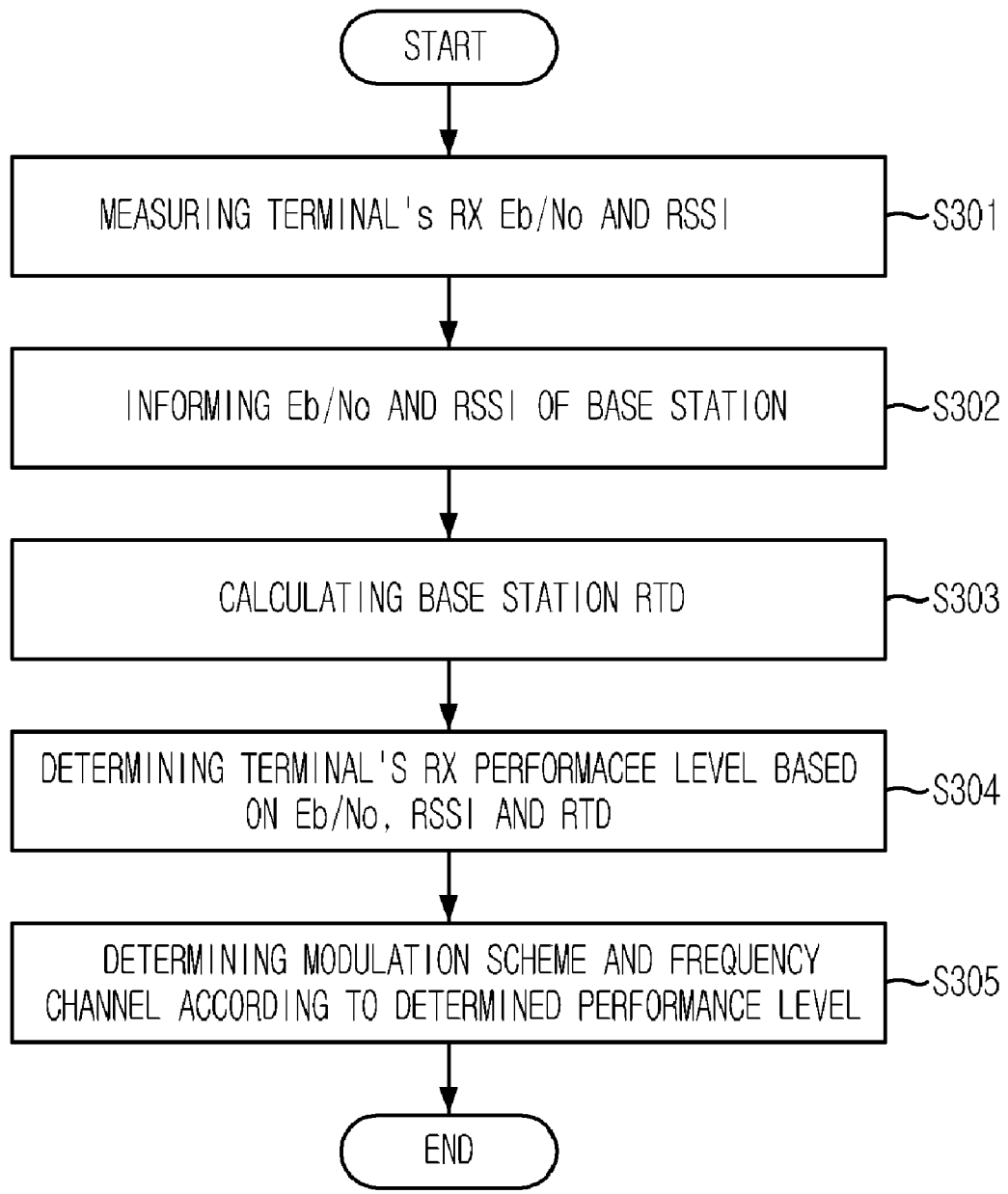

[Fig. 4]
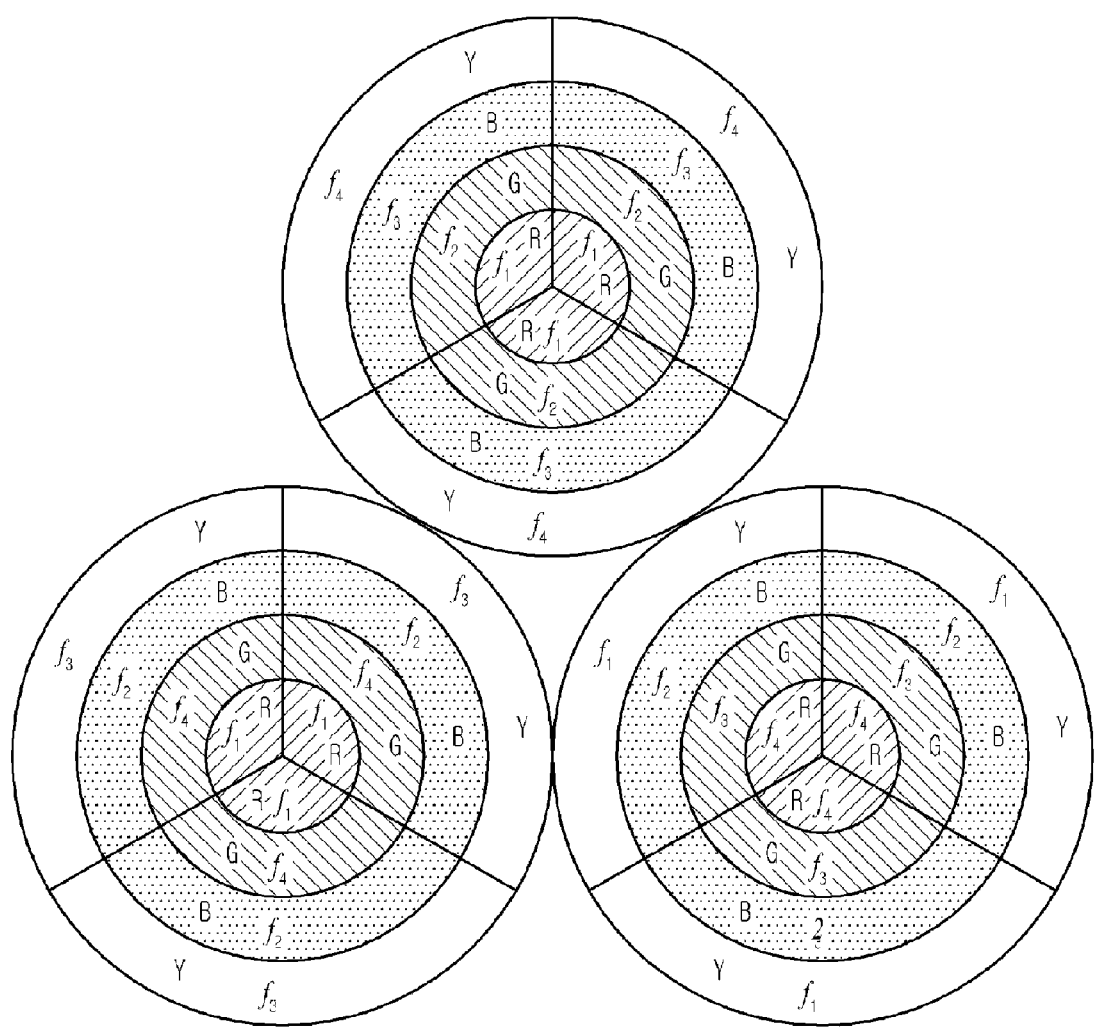

METHOD FOR MANAGING MULTIPLE FREQUENCY ASSIGNMENT USING TERMINAL'S RECEIVED PERFORMANCE IN OFDMA WRAN SYSTEM

TECHNICAL FIELD

The present invention relates to a method for managing a multiple frequency assignment (FA) using a terminal's received (RX) performance in an orthogonal frequency division multiple access (OFDMA) wireless regional area network (WRAN) system; and, more particularly, to a method for managing a multiple frequency assignment using a terminal's RX performance in an OFDMA WRAN system, which determines a frequency channel and a modulation method based on a received bit energy/noise power spectral density (Eb/No), a received signal strength indicator (RSSI) and a round trip delay (RTD) to improve a peak to average power (PAPR) performance, a ranging performance, a forward or reverse power control performance of a modulation signal of a base station using a multiple FA in an OFDMA WRAN system.

BACKGROUND ART

In a WRAN system of which a standardization process has been performed, a wireless Internet service is provided by using unused time and spaces of a primary user of television or wireless devices in a television frequency band or a wireless microphone communication frequency band, e.g., 54 MHz to 698 MHz band in channels '2' to '51' in case of USA, and 41 MHz to 910 MHz band in case of an international use.

The WRAN system provides an asymmetric digital subscriber line (ADSL) or a wideband Internet service similar to a cable modem to a home and an office, and has a typical service range having a cell radius of 33 km. Accordingly, a customer premises equipment (CPE) is fixed, and uses an adaptive modulation and an adaptive channel coding method to improve a packet throughput under an environment including cells having a large service range of a cell radius of 33 km to 100 km. A diversity using a repeated transmission of sub-carriers in OFDMA method is applied to satisfy a quality of service (QoS) at cell borders.

The WRAN system is included in technologies of which a standardization process has been performed in institute of electrical and electronics engineers (IEEE) 802.22. The current standardization process of IEEE802.22 is actively performed so that substitutes of standard regulations proposed from each country are integrated into a single standard regulation.

Meanwhile, adaptive modulation and adaptive channel coding technologies under a mobile wireless channel environment are previously proposed in an international mobile telecommunication-2000 (IMT-2000), a WLAN, and IEEE802.16. Main characteristics of the proposed technologies are to maintain a received signal quality and maximize a throughput in a limited channel resource by applying the adaptive modulation and adaptive channel coding scheme adaptively according to the receiving signal quality.

In an OFDMA method of the IEEE802.16 which is introduced as a conventional technology, each terminal assigns channels by clustered sub-carrier basis. The terminal applies the adaptive modulation and adaptive channel coding to different clustered sub-carriers on the same frequency channel.

However, in the OFDMA method, the PAPR increases by a modulation scheme and the number of sub-carriers of a high spectrum-efficiency. In modulation schemes of a binary phase shift keying (BPSK), a quadrature phase shift keying (QPSK), 16-quadrature amplitude modulation (16-QAM), 64-quadrature amplitude modulation (64-QAM) and 256-quadrature amplitude modulation (256-QAM), the BPSK scheme has the smallest PAPR value, and the 256QAM scheme has the largest PAPR value.

However, in the OFDMA method, the subscriber channels are assigned by the clustered sub-carrier basis. There is a problem that overall PAPR are determined by a modulation scheme having the largest PAPR value in case that a different modulation scheme is used in each subscriber channel.

Moreover, a cell radius of the WRAN system is about 33 km and has a large service range. However, in the OFDMA method, there is a problem that it is difficult to perform a ranging and a power control in a large service range.

DISCLOSURE OF INVENTION

Technical Problem

An embodiment of the present invention is directed to providing a method for managing a multiple frequency assignment using a terminal receiving performance in an orthogonal frequency division multiple access (OFDMA) wireless regional area network (WRAN) system, which determines a frequency channel and a modulation method based on a received bit energy/noise power spectral density (Eb/No), a received signal strength indicator (RSSI) and a round trip delay (RTD) to improve a peak to average power (PAPR) performance, a ranging performance, a forward or reverse power control performance of a modulation signal of a base station using a multiple FA in an OFDMA WRAN system.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for managing a multiple frequency assignment using a terminal's RX performance in an OFDMA WRAN system, including: a) measuring a bit energy/noise power spectral density (Eb/No) and a received signal strength indicator (RSSI) which are received in the terminal; b) informing the measured Eb/No and RSSI of a base station; c) calculating a round trip delay (RTD) in the base station; d) determining a terminal performance level based on the measured Eb/No, RSSI and the calculated RTD; and e) determining a frequency channel and modulation scheme based on the determined performance level.

The advantages, features and aspects of the invention will become apparent from the following description of the embodiments with reference to the accompanying drawings, which is set forth hereinafter.

Advantageous Effects

The present invention as mentioned above, has a merit that a performance in view of a reduction of the PAPR performance in overall system is improved more in case that the frequency channels and modulation schemes are differently set according to terminal groups which are classified by the performance level determined by the Eb/No, RSSI and RTD than in case that all modulation schemes, e.g., QPSK, 16QAM, 64QAM and 256QAM, are applied to a conventional one frequency channel by the clustered sub-carriers basis since different modulation schemes are applied according to frequency channels.

Moreover, the present invention manages the throughput classified by frequency channels for terminals having similar received quality with the same modulation scheme by setting different modulation schemes and frequency channels according to the performance level, and improves the ranging performance, e.g., a time-offset control, a forward and reverse power control and a frequency-offset control.

BRIEF DESCRIPTION OF THE DRAWINGS

FIG. 1 is a block diagram illustrating a cell shape of a base station in an OFDMA WRAN system using a method for managing a multiple frequency assignment in accordance with an embodiment of the present invention.

FIG. 2 is a block diagram illustrating a cell shape of a base station in an OFDMA WRAN system using a method for managing a multiple frequency assignment in accordance with another embodiment of the present invention.

FIG. 3 is a flowchart illustrating a method for managing a multiple frequency assignment using a terminal's RX performance in an OFDMA WRAN system in accordance with an embodiment of the present invention.

FIG. 4 is a block diagram illustrating a method for re-using a frequency in a cellular system using a method for managing a multiple frequency assignment in accordance with an embodiment of the present invention.

BEST MODE FOR CARRYING OUT THE INVENTION

FIG. 1 is a block diagram illustrating a cell shape of a base station in an OFDMA WRAN system using a method for managing a multiple frequency assignment in accordance with an embodiment of the present invention.

A WRAN base station of a WRAN system using a multiple FA has an average cell radius of 33 km. Terminals thereof are fixed. The present invention improves a PAPR performance of a modulation signal of a base station, a ranging performance and a forward and reverse power control performance in a multiple FA operation condition of the OFDMA WRAN system based on the WRAN service environment characteristic mentioned above.

A present invention which is a technology corresponding to the adaptive modulation and adaptive channel coding determines a performance level by using a terminal's RX Eb/No, an RSSI and RTD in a process which assigns a channel to a terminal. In the present invention, a frequency channel and the modulation and channel coding scheme are set in a channel assignment of the corresponding terminal having the determined performance level.

Moreover, in the present invention, the same frequency channel and the same modulation scheme are assigned to the terminals having the similar terminal's RX Eb/No, the RSSI and the RTD values.

In the present invention, since different modulation schemes are applied according to frequency channels, a performance in view of a reduction of the PAPR performance in overall system is improved more in case that the frequency channels and modulation schemes are differently set according to terminal groups which are classified by the performance level determined by the Eb/No, RSSI and RTD than in case that all modulation schemes, e.g., QPSK, 16QAM, 64QAM and 256QAM, are applied to a conventional one frequency channel by the clustered sub-carriers basis.

Moreover, in view of a terminal transmission power control in a reverse link, a transmission power control is performed according to terminal groups which the same frequency channel is assigned to, and an operation range of the transmission power control caused by a far and near problem is reduced according to a service range of a cell.

In particular, in case that the cell radius is 33 km, the transmission power of the base station should be increased to maintain an average throughput of a terminal located on a cell border. In case that different modulation scheme is assigned to the same frequency channel, it is efficient in view of a performance of a high power amplifier (HPA) and a forward power control that different modulation scheme is assigned to supplement demerits of the generation of an inter-modulation distortion (IMD) from an overload of the HPA in the forward power control.

Further, if the modulation schemes are differentiated according to the Eb/No, RSSI and RTD, and the frequency channels are differently set, the throughput management is performed according to the frequency channels for terminals having the similar received (RX) quality with the same modulation scheme. A ranging performance of time offset adjustment, forward and reverse power adjustment, frequency offset adjustment is improved for terminals having the similar RTD.

As shown in FIG. 1, in the present invention, the frequency channels are differently assigned according to the modulation scheme in the OFDMA scheme based on the characteristic of the WRAN system.

In a conventional OFDMA method of a portable Internet, the adaptive modulation and adaptive channel coding scheme is applied to the same frequency channel according to the terminal's received (RX) Eb/No for a multi-user diversity gain. However, in the present invention, as described in table 1 and FIG. 1, the modulation scheme and frequency channels are assigned according to a performance level which is determined by the terminal receiving Eb/No, RSSI and RTD.

TABLE 1

| Performance level | Modulation scheme | Coding ratio | Spectrum efficiency(bps/Hz) | Frequency channel |
| --- | --- | --- | --- | --- |
| 1 | 256QAM | 7/8 | 5.16 | $f_1$ |
|   |   | 5/6 | 4.89 |   |
|   |   | 3/4 | 4.40 |   |
|   |   | 2/3 | 3.91 |   |
|   |   | 1/2 | 2.93 |   |
| 2 | 64QAM | 7/8 | 3.85 | $f_2$ |
|   |   | 5/6 | 3.67 |   |
|   |   | 3/4 | 3.30 |   |
|   |   | 2/3 | 2.93 |   |
|   |   | 1/2 | 2.20 |   |
| 3 | 16QAM | 7/8 | 2.57 | $f_3$ |
|   |   | 5/6 | 2.45 |   |
|   |   | 3/4 | 2.20 |   |
|   |   | 2/3 | 1.96 |   |
|   |   | 1/2 | 1.47 |   |
| 4 | QPSK | 7/8 | 1.28 | $f_4$ |
|   |   | 5/6 | 1.22 |   |
|   |   | 3/4 | 1.10 |   |
|   |   | 2/3 | 0.98 |   |
|   |   | 1/2 | 0.73 |   |

As described in the table 1, the reduction of PAPR, the improvement of forward and reverse power control and the improvement of ranging performance of the multiple FA base station modulation signal are achieved by assigning the 256QAM modulation scheme to the highest Eb/No and RSSI, assigning the QPSK modulation scheme to the lowest Eb/No and RSSI, and differently assigning frequency channels according to modulation schemes through a method which classifies service ranges (that is, performance levels) into 4 sorts based on the terminal's RX Eb/No, RSSI and RTD.

On the other hand, if at least four frequency channels used in the wireless recognizing technology of the WRAN system according to the present invention are obtained, different frequency channels are assigned according to a modulation scheme in three-sector base station as shown in FIG. 1.

As shown in FIG. 1, in case that the terminal's RX Eb/No and RSSI are the highest at neighboring region of the base station, the 256QAM modulation scheme and frequency channel "$f_1$" is assigned to "R" region of a first level performance, the 64QAM modulation scheme and frequency channel "$f_2$" is assigned to "G" region of a second level performance, the 16QAM modulation scheme and frequency channel "$f_3$" is assigned to "B" region of a third level performance, and the QPSK modulation scheme and frequency channel "$f_4$" is assigned to "Y" region of a fourth level performance.

If at least four frequency channels used in the WRAN base station are not obtained, modulation schemes and frequency channels are assigned as shown in FIG. 2 and table 2.

TABLE 2

| Number of Available frequencies | Channel number | Modulation scheme |
|---|---|---|
| 4 | $f_1$ | 256QAM |
|   | $f_2$ | 64QAM |
|   | $f_3$ | 16QAM |
|   | $f_4$ | QPSK |
| 3 | $f_1$ | 256QAM |
|   | $f_2$ | 64QAM |
|   | $f_3$ | 16QAM, QPSK |
| 2 | $f_1$ | 256QAM, 64QAM |
|   | $f_2$ | 16QAM, QPSK |
| 1 | $f_1$ | 256QAM, 64QAM, 16QAM, QPSK |

FIG. 2 is a block diagram illustrating a cell shape of a base station in an OFDMA WRAN system using a method for managing a multiple frequency assignment in accordance with another embodiment of the present invention.

As shown in FIG. 2, "210" indicates a case that the number of available frequencies is three, "220" indicates a case that the number of available frequencies is two, and "230" indicates a case that the number of available frequencies is three.

In the case that the number of available frequencies is three 210, the 256QAM is assigned to "$f_1$" the 64QAM is assigned to "$f_2$" and the 16QAM and QPSK are assigned to "$f_3$".

In the case that the number of available frequencies is two 220, the 256QAM and 64QAM are assigned to "$f_1$" and the 16QAM and QPSK are assigned to "$f_2$".

In the case that the number of available frequencies is one 230, the 256QAM, 64QAM, 16QAM and QPSK are assigned to "$f_1$" according to the terminal's RX Eb/No and RSSI as a conventional adaptive modulation & coding (AMC).

In a terminal, the receiving Eb/No is measured based on an up link-map (UL-MAP), a down link-map (DL-MAP), a frame control channel (FCH) and a preamble of a downlink burst. Here, a transmission power, a modulation scheme and a channel coding scheme which are assigned to the preamble, FCH, DL-MAP and UL-MAP of frequency channels used in the base station are the same with each other.

FIG. 3 is a flowchart illustrating a method for managing a multiple frequency assignment using a terminal receiving performance in an OFDMA WRAN system in accordance with an embodiment of the present invention, and illuminates a process which assigns a frequency channel and a modulation scheme to the terminal.

As shown in FIG. 3, in a method for managing a multiple frequency assignment using a terminal's RX performance in an OFDMA WRAN system in accordance with an embodiment of the present invention, the Eb/No and RSSI received in the terminal are measured at step S301 and the measured Eb/no and RSSI are informed of the base station at step S302. The base station calculates the RTD at step S303, and determines the terminal's RX performance level based on the measured Eb/No and RSSI and the calculated RTD at step S304, and determines a frequency channel and modulation scheme according to the determined the terminal's RX performance level at step S305.

That is, in the S301 step, the terminal measures the terminal receiving Eb/No and RSSI based on the preamble, FCH, DL-MAP and UL-MAP, and the measured value is informed of the base station when a channel assignment is requested. Then, the base station performs the S303 step of measuring the RTD of corresponding terminal in an initial ranging process.

Finally, the base station performs the S304 step of determining the terminal performance level based on the measured Eb/No, RSSI and RTD, and the S305 step of determining a frequency channel and modulation scheme suitable for the terminal according to the determined performance level.

FIG. 4 is a block diagram illustrating a method for re-using a frequency in a cellular system using a method for managing a multiple frequency assignment in accordance with an embodiment of the present invention.

A cellular system using an OFDMA method which is configured to have a frequency reusing efficiency of "1" is applied to the present invention. A transmission power for a preamble of a downlink burst, a preamble and control signal of the FCH, DL-MAP and UL-MAP in each cell is the same with respect to all frequency channels.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the scope of the invention as defined in the following claims.

The invention claimed is:

1. A method for managing a multiple frequency assignment using a terminal's received (RX) performance in an orthogonal frequency division multiple access (OFDMA) wireless regional area network (WRAN) system, comprising:
   a) measuring a bit energy/noise power spectral density (Eb/No) and a received signal strength indicator (RSSI) which are received in the terminal;
   b) informing the measured Eb/No and RSSI of a base station wherein the measuring is performed based on an up link-map (UL-MAP), a down link-map (DL-MAP), a frame control channel (FCH) and a preamble of a downlink burst, and a transmission power, a modulation scheme, a channel coding scheme which are assigned to the FCH, DL-MAP and UP-MAP of frequency channels used in the base station;

c) calculating a round trip delay (RTD) in the base station;

d) determining a terminal's RX performance level based on the measured Eb/No, RSSI and the calculated RTD; and e) determining a frequency channel and modulation scheme based on the determined performance level, wherein a different modulation scheme is assigned to each frequency channel.

2. The method of claim 1, wherein in the step c), the RTD of the terminal is measured in an initial ranging process of the terminal.

3. The method of claim 2, wherein in step e), the modulation scheme is differently assigned according to the highest Eb/No and RSSI and the lowest Eb/No and RSSI, and the frequency channel is differently assigned according to the modulation scheme.

4. A method for managing a multiple frequency assignment using a terminal's received (RX) performance in an orthogonal frequency division multiple access (OFDMA) wireless regional area network (WRAN) system, comprising:

a) measuring a bit energy/noise power spectral density (Eb/No) and a received signal strength indicator (RSSI) which are received in the terminal;

b) informing the measured Eb/No and RSSI of a base station wherein the measuring is performed based on an up link-map (UL-MAP), a down link-map (DL-MAP), a frame control channel (FCH) and a preamble of a downlink burst, and a transmission power, a modulation scheme, a channel coding scheme which are assigned to the FCH, DL-MAP and UP-MAP of frequency channels used in the base station;

c) calculating a round trip delay (RTD) in the base station;

d) determining a terminal's RX performance level based on the measured Eb/No, RSSI and the calculated RTD; and e) determining a frequency channel and modulation scheme based on the determined performance level, wherein a 256QAM and a 64QAM modulation scheme are assigned to a first frequency channel and a 16QAM and a QPSK modulation scheme are assigned to a second frequency channel, wherein the first and second frequency channels are the only available frequency channels.

* * * * *